United States Patent [19]

Bernauer

[11] Patent Number: 5,182,089
[45] Date of Patent: Jan. 26, 1993

[54] CHEMISORPTIVE METAL ALLOY AND METHOD OF USING THE SAME

[75] Inventor: Otto Bernauer, Moers, Fed. Rep. of Germany

[73] Assignee: Mannesmann Aktiengesellschaft, Dusseldorf, Fed. Rep. of Germany

[21] Appl. No.: 658,034

[22] Filed: Feb. 20, 1991

[30] Foreign Application Priority Data

Feb. 20, 1990 [DE] Fed. Rep. of Germany ....... 4005695

[51] Int. Cl.$^5$ .............................................. C01B 7/07
[52] U.S. Cl. .................................. 423/219; 423/210; 423/230; 423/247; 423/248; 423/239; 420/492
[58] Field of Search ............... 423/241, 240 S, 210, 423/248, 219, 230, 239 R, 245.1, 247; 420/417, 492, 587, 900

[56] References Cited

U.S. PATENT DOCUMENTS

| | | | |
|---|---|---|---|
| 3,793,435 | 2/1974 | Reilly et al. | 423/248 |
| 4,594,231 | 6/1986 | Nishiho et al. | 423/210 |
| 4,910,001 | 3/1990 | Kitahara et al. | 423/210 |
| 5,019,364 | 5/1991 | Kitahara et al. | 423/210 |
| 5,080,875 | 1/1992 | Bernauer | 423/210 |

FOREIGN PATENT DOCUMENTS

| | | | |
|---|---|---|---|
| 3210381 | 5/1983 | Fed. Rep. of Germany . | |
| 58-120511 | 7/1983 | Japan | 423/347 |
| 62-286521 | 12/1987 | Japan | 423/210 |

*Primary Examiner*—Michael Lewis
*Assistant Examiner*—Stuart L. Hendrickson
*Attorney, Agent, or Firm*—Cohen, Pontani, Lieberman, Pavane

[57] ABSTRACT

A chemisorptive metal alloy includes from about 30% to about 70% by weight of Ti and/or Zr and from about 30% to about 70% by weight of Cu. Optionally, the alloy may also contain from 0% to about 5% by weight of Fe; from 0% to about 10% by weight of Ni; from 0% to about 5% of V; and from 0% to about 5% of Cr.

A method of purifying a reactive gas and removing foreign impurities therefrom includes conducting the impurities containing reactive gas, such as chlorine, hydrogen chloride, silane and dichlorosilane, through a bed of the above described pulverized metal alloy and removing the impurities from the gas by chemisorption on the alloy.

5 Claims, No Drawings

CHEMISORPTIVE METAL ALLOY AND METHOD OF USING THE SAME

FIELD OF THE INVENTION

The present invention relates to a chemisorptive metal alloy containing titanium and/or zirconium as well as copper, and to a method of purifying impure gases by chemisorption of foreign gas components in a pile of metal powder.

BACKGROUND AND SUMMARY OF THE INVENTION

From Federal Republic of Germany 32 10 381 C1 an alloy for storing hydrogen is known which may contain (in weight %) 25–30.9% Ti, 10–42% V, 27.1–65.1% Mn and up to 0.05 Cu atoms per Ti atom, which corresponds to an amount of copper of at most about 2%. This alloy is suitable basically for the purification of gaseous hydrogen in a bulk reactor, wherein the hydrogen gas, which is conducted into a bed of powder consisting of said alloy, is absorbed with the formation of a metal hydride while other components of the gas experience at least no substantial absorption. After further charging of the pile of metal powder with hydrogen, the feeding of raw gas is interrupted and the bulk reactor is heated. In this way, the hydrogen gas, which is bound in the metal hydride, is again liberated. In an initial phase, the foreign gas components contained in the bulk reactor are blown off in form of the so-called unpurified top gas. Thereafter, only the purified hydrogen gas is exhausted from the reactor.

In principle, such a bulk reactor can also be used for removing hydrogen from another gas, for instance, argon in which hydrogen is contained as the foreign gas component. In such case, the unpurified gas is conducted into the bulk reactor and can again be utilized immediately after the passage through the bulk bed as a stream of gas which has been freed of hydrogen. Of course, the bulk bed of alloy must be subjected at regular intervals to a regeneration of its hydrogen-storage capacity by heating it in the manner described above.

Hydride-forming metal alloys, as a rule, also tend to absorb other gases or tend to form compounds therewith. Such compounds are considered irreversible with respect to the customary regeneration of a corresponding chemisorption bulk bed so that the hydride-forming metal alloy is readily spent in such cases. This is true, in particular, of reactive special gases such as chlorine, hydrogen chloride, silane, dichlorosilane and similar gases. The purification of such special gases has not been possible up to now or at least it was not possible to satisfactorily carry out such purification with the known alloys.

An object of the present invention is, therefore, to provide an alloy and a method of purification of reactive special gases in a cost-favorable manner.

The alloy of the present invention contains titanium and/or zirconium in a total amount of from about 30 to about 70% as well as copper in an amount of from about 30 to about 70%. Additionally, the alloy may contain as accompanying elements, up to about 5% iron, up to about 10% nickel, up to about 5% vanadium and up to about 5% chromium. Unless otherwise indicated, all percent given herein are percent by weight. It should be noted that the accompanying elements are not necessary in order to obtain the desired effect in accordance with the present invention but these elements favor the economy of the alloy since they permit the use of cheaper mixed alloys as feed materials for the melting.

The method of purification of the present invention is characterized by the fact that it is carried out in accordance with the customary continuous-flow method in which the gas to be purified is preferably passed in a continuous flow reactor through a bed of powder composed of the metal alloy of the present invention, and the foreign-gas components are chemsorbed from said alloy while the pure gas to be recovered does not react practically at all with the alloy. The reaction with the foreign gas components is practically irreversible so that the bed of powder must be replaced from time to time depending on the amount of foreign gas present therein and the requirement as to the degree of purity of the special gases to be purified.

Since the known alloys used for the purification of gas by chemisorption are very unstable with respect to reactive special gases such as chlorine, hydrogenchloride, silane, dichlorosilane or similar gases and, therefore, react rapidly with said gases, it was extremely surprising that the alloys of the type of the present invention behave entirely differently and form practically no compounds with these special gases "which in themselves are very reactive", but chemsorbed only the otherwise unreactive or less reactive gas components. They take up not only foreign gas components such as hydrogen, oxygen, carbon monoxide, moisture ($H_2O$) and hydrocarbons but even inert gases such as nitrogen are bound.

The effectiveness of the invention will be explained in further detail on basis of two exemplary embodiments. In a first test, gaseous hydrogen chloride was conducted through a continuous-flow reactor which was filled with a fine-grain bed of an alloy having the following composition:

60% Ti
36% Cu
4% Ni

The purification effect can be noted from the following table of the foreign gas components contained in the raw gas and in the purified gas.

| Foreign Gas Components | Raw Gas (vpm) | Pure Gas (ppm) |
|---|---|---|
| Hydrogen | 557 | 45 |
| Nitrogen + Argon | 34 | <2 |
| Nitrogen | 1863 | 126 |
| Carbon Monoxide | 54 | 20 |
| Moisture | <2 | <2 |
| Hydrocarbons | <2 | <2 |

While the moisture and hydrocarbon contents of the raw gas were already below the limit of sensitivity of the gas chromatograph used, degrees of purification of more than 94% were obtained with oxygen plus argon, 93% with hydrogen, 93% with nitrogen and 63% with carbon monoxide.

In a second test, an alloy of 43% Ti and 57% Cu was used for the purification of chlorine gas. In this case, the results of the analysis of the raw gas and of the purified gas were as follows:

| Foreign Gas Components | Raw Gas (vpm) | Pure Gas (ppm) |
|---|---|---|
| Hydrogen | <20 | <20 |
| Oxygen + Argon | 4500 | 53 |
| Nitrogen | 14600 | 149 |
| Carbon monoxide | <5 | <5 |

-continued

| Foreign Gas Components | Raw Gas (vpm) | Pure Gas (ppm) |
|---|---|---|
| Carbon dioxide | 660 | 49.5 |
| Hydrocarbons | <1 | <1 |
| Moisture | <2 | <2 |

As can be seen, the degree of purification was even 99% with nitrogen, more than 98% with oxygen plus argon, and 92% with carbon dioxide. The other foreign gas components were below the limit of sensitivity of the measuring apparatus already in the raw gas. However, it can be assumed that also these foreign gas components were still further reduced as compared with their starting values, which had originally already been low.

It should be understood that the preferred embodiments and examples described are for illustrative purposes only and are not to be construed as limiting the scope of the present invention which is properly delineated only in the appended claims.

What is claimed is:

1. A method of purifying a reactive gas comprising one or both of the group consisting of chlorine and hydrogen chloride, containing one or more impurities selected from the group consisting of hydrogen, oxygen, argon, nitrogen, carbon monoxide and carbon dioxide, comprising:

conducting said impurities containing reactive gas through a bed of pulverized metal alloy and removing said impurities from said gas by chemisorption on said alloy;

said alloy comprising from about 30 to about 70% by weight of at least one of Ti and Zr; and from about 70 to about 30% by weight of Cu.

2. The method of claim 1, wherein said pulverized alloy additionally comprises from 0 to about 5% by weight of Fe; from 0 to about 10% by weight of Ni; from 0 to about 5% of V; and from 0 to about 5% of Cr.

3. The method of claim 1, wherein said pulverized alloy additionally comprises from 0 to about 5% by weight of Fe; from 0 to about 10% by weight of Ni; and from 0 to about 5% of Cr.

4. The method of claim 1, wherein said pulverized alloy comprises 60% of Ti, 36% of Cu, and 4% of Ni.

5. The method of claim 1, wherein said pulverized alloy comprises 43% of Ti and 57% of Cu.

* * * * *